(12) United States Patent
Lederer

(10) Patent No.: US 8,139,511 B2
(45) Date of Patent: Mar. 20, 2012

(54) METHOD AND SYSTEM FOR TRANSMITTING AN ADDRESS INTO AN ELECTRONIC FORM FOR A PARTICIPANT OF A COMMUNICATION LINK

(75) Inventor: Thomas Lederer, Herrsching (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1056 days.

(21) Appl. No.: 11/991,206

(22) PCT Filed: Jul. 7, 2006

(86) PCT No.: PCT/EP2006/064020
§ 371 (c)(1),
(2), (4) Date: Feb. 28, 2008

(87) PCT Pub. No.: WO2007/025794
PCT Pub. Date: Mar. 8, 2007

(65) Prior Publication Data
US 2011/0075665 A1  Mar. 31, 2011

(30) Foreign Application Priority Data
Aug. 31, 2005 (DE) .......................... 10 2005 041 369

(51) Int. Cl.
*H04L 12/16* (2006.01)
(52) U.S. Cl. ..................... 370/260; 370/261; 348/14.08; 709/204
(58) Field of Classification Search .................. 370/392, 370/352, 260–269; 455/414, 466, 552; 709/204, 709/206; 348/14.08
See application file for complete search history.

(56) References Cited

U.S. PATENT DOCUMENTS

| 5,655,015 A | 8/1997 | Gasparro et al. |
| 5,953,400 A * | 9/1999 | Rosenthal et al. ........ 379/202.01 |
| 2002/0116536 A1 * | 8/2002 | Clercq et al. ................... 709/250 |

(Continued)

FOREIGN PATENT DOCUMENTS

EP  1 562 132 A1  8/2005

OTHER PUBLICATIONS

"CTI Data Connector" Mirage Systems; Internet Citation (online); XP002401505, found in the internet: URL: http://www.mirage-systems.de/fileadmin/download/cdc/cti-data-connector-oem-version.ppt, found on Oct. 3, 2006, pp. 1-22; pp. 4-13, pp. 16-17, pp. 20-21 -& Mirage Systems: "Index of file/admin/download/cdc" Internet Citation, online, Oct. 17, 2005; XP002401506, found in the internet: URL: http://www.mirage-systems.de/fileadmin/download/cdc/ , found on Oct. 3, 2006 for the date of document 1.

(Continued)

*Primary Examiner* — Dang Ton
*Assistant Examiner* — Mandish Randhawa

(57) ABSTRACT

A method and a system for transferring a PIM-address in an electronic formula of a PIM-application, based on a communication connection between end devices of subscribers in a communication system are provided. A communication system address, which identifies the second end device, detects user input of a first subscriber. The detected communication system-address is converted into a PIM address which identifies a second subscriber, the PIM-address to the PIM-application and the transferred PIM-address is input into a field of the electronic formula of the PIM-application.

20 Claims, 2 Drawing Sheets

U.S. PATENT DOCUMENTS

| | | | |
|---|---|---|---|
| 2002/0128036 A1* | 9/2002 | Yach et al. | 455/552 |
| 2003/0064715 A1* | 4/2003 | Sugane | 455/414 |
| 2003/0149606 A1* | 8/2003 | Cragun et al. | 705/8 |
| 2004/0015547 A1* | 1/2004 | Griffin et al. | 709/204 |
| 2004/0214558 A1 | 10/2004 | Chang | |
| 2005/0010573 A1* | 1/2005 | Garg | 707/10 |
| 2005/0048958 A1 | 3/2005 | Mousseau et al. | |
| 2005/0059439 A1 | 3/2005 | White | |
| 2005/0261011 A1* | 11/2005 | Scott | 455/466 |
| 2006/0031364 A1* | 2/2006 | Hamilton et al. | 709/206 |
| 2007/0036137 A1* | 2/2007 | Horner et al. | 370/352 |

OTHER PUBLICATIONS

"CTI Dial-It" NEC Business Solutions Ltd; Internet citation, online; Mar. 2004; XP002401507, found in the internet: URL: http://www.necbs.com.au/docs/APPs/dialit.pdf found on Oct. 3, 2006, pp. 1-2.

"NetWare® Telephony Services Application Programming Interface (TSAPI)", Version 2, Issue 3.0,; Announcemaent Lucent, Apr. 1998, pp. i-xii, 1-1 thru1-2, 2-1 thru 2-6 and 3-1 thru 3-18, XP002267338.

* cited by examiner

METHOD AND SYSTEM FOR TRANSMITTING AN ADDRESS INTO AN ELECTRONIC FORM FOR A PARTICIPANT OF A COMMUNICATION LINK

CROSS REFERENCE TO RELATED APPLICATIONS

This application is the US National Stage of International Application No. PCT/EP2006/064020, filed Jul. 7, 2006 and claims the benefit thereof. The International Application claims the benefits of German application No. 102005041369.2 DE filed Aug. 31, 2005, both of the applications are incorporated by reference herein in their entirety.

FIELD OF INVENTION

The present invention relates to a transmission of an address into an electronic form for a participant of a communication link

BACKGROUND OF INVENTION

It is a frequent occurrence in the case of modern office workplaces that a telephone conference is initiated by way of a telephone private branch exchange in order to implement meetings between employees. In this respect, a telephone conference can be convened on an ad hoc basis or be fixed for a specific appointment on a scheduled basis.

So-called PIM (Personal Information Management) systems or collaboration systems—also referred to as groupware—are frequently employed for planning meeting appointments. As at the time of the patent application, representatives of such systems comprise for example the products Lotus Notes and Microsoft Exchange. PIM systems provide functions for planning a meeting where normally a user of the PIM System enters desired participants of a meeting, the period for the meeting, and further information such as the agenda for the meeting in an electronic form of a PIM client or a PIM application on a computer.

The participants of a meeting are frequently identified by way of their e-mail addresses in such PIM systems, so that after the electronic form has been filled out and sent, an e-mail can be transferred to the desired participants of the meeting with the further data on the electronic form. The desired participants of the meeting then receive an invitation to the meeting in their respective PIM application which they can then agree to or decline.

Usually, at office workplaces, meetings such as telephone conferences are scheduled manually by means of user inputs by way of the PIM system. In spite of being supported by the PIM system, the scheduling of such meetings frequently requires many manual steps, e.g. ascertaining e-mail addresses for the purposes of sending the meeting inquiry to the meeting participants, and determining the telephone numbers of the meeting participants for the purposes of implementing the telephone conference.

SUMMARY OF INVENTION

The object of the invention is to specify a method and a system for transmitting a PIM address into an electronic form of a PIM application of a PIM system, in which a filling out of a form of a PIM application by a participant is simplified.

This object is achieved by a method and a system with the features of the independent claims.

Advantageous embodiments and developments of the invention are specified in the dependent claims.

In the case of the inventive method for transmitting a PIM address into an electronic form of a PIM application of a PIM system, in which a communication link—in particular for voice—exists between a first end device of a first participant and a second end device of a second participant in a communication system, in particular a circuit-based or packet-based real-time communication system, a communication system address which identifies the second end device in the context of the communication link is captured as a result of a user input of the first participant. The captured communication system address is converted into a PIM address for the PIM system, which address identifies the second participant. The PIM address is transferred to the PIM application of the first participant. The transferred PIM address is entered in a field of the electronic form of the PIM application.

For the purposes of carrying out the method steps referred to in the foregoing, the inventive system provides an input means for detecting the user input, a data capture unit for capturing the communication system address, a conversion unit for converting the captured communication system address into the PIM address, a transfer unit for transferring the PIM address to the PIM application of the first participant, and a form-filling unit for entering the transferred PIM address into a field of the electronic form of the PIM application.

Preferably, the user input of the first participant can be implemented during or after implementation of the communication link at the first end device or by using the PIM application of the first participant. In this respect, the user input can comprise in particular a key press on the first end device, an input of a code number by way of the first end device, a selection of a menu item on a menu of the first end device or an activation of a button or a menu item of a graphical user interface of the first end device or the PIM application.

The end devices can comprise in particular telephone terminals of a private branch exchange, mobile communication terminals, fixed network telephones on exchange lines of the private branch exchange and/or so-called telephone soft clients on a computer. The PIM address can preferably comprise an e-mail address, and the communication system address in particular a directory number or a line number of a terminal.

The PIM system can preferably comprise a client/server computer system in which participants can utilize functions of the PIM system by way of respective PIM applications, also referred to in the following as PIM clients. In this respect, functions can comprise the electronic management of tasks, appointments, e-mails, and/or electronic notes of a respective participant. The PIM application, by which a participant can control these functions, can be run in particular on a PC, a PDA, and/or a mobile communication terminal. A commercial example of a PIM system would be Microsoft Outlook as the PIM client and Microsoft Exchange as the PIM server of the PIM system.

The invention is advantageous to the extent that a form field that needs to be filled out with a PIM address can be entered automatically for a participant of a communication link. This is based on the experience that, for the second participant of a voice communication link, at the same time as the voice communication link or—preferably close in time—after the termination of the voice communication link, the PIM address of the second participant of the voice communication link needs to be entered in a form of the PIM system—e.g. in the context of the compilation of a record of a discussion or for scheduling a further, future voice communication link— and this would be carried out manually by the first participant without the inventive method. The quantity of steps to be carried out manually is therefore lessened by the invention, which results in increased efficiency and faster filling out of the electronic form. Furthermore, incorrect input of PIM addresses can be reduced.

An implementation of the foregoing method steps after the termination of the communication link is possible in particular if a CTI application is informed about all implemented links of the switching system and if it is advised of the participants of the links. The CTI application can therefore ascertain the participants of a link even after the termination of that communication link. In this respect, the CTI application can comprise a component of the switching system or be connected to it.

An ascertainment of the PIM address without using the inventive method frequently proves to be difficult since a direct allocation between communication system address and PIM address is frequently not stored either in the PIM system or in the communication system. The invention therefore facilitates the ascertainment of the PIM address.

In an advantageous embodiment of the invention, the electronic form can comprise an appointment inquiry form and/or a meeting inquiry form, it being possible to send the meeting inquiry form manually or automatically and as a result of this, it is transferred to the participants entered in the meeting inquiry form as a meeting inquiry.

Furthermore, the communication link can be configured as a conference circuit with at least three participants. By way of advantage, therefore, a field can be filled out with PIM addresses of desired participants of a future meeting, or an address field of participants who need to be informed, based on the participants of a current conference circuit.

This is advantageous to the extent that in the case of meetings and telephone conferences, the wish can frequently arise during or after the meeting to consult again with all or some participants of the meeting. In this respect, it is normally necessary, for the purposes of scheduling the further meeting, that a participant of the telephone conference has to manually ascertain or ask for the e-mail addresses of the participants of the current telephone conference for the purposes of filling out the form in the PIM application, and furthermore has to enter them manually in the form. By way of advantage, this can be carried out in an automated manner in the embodiment of the invention referred to in the foregoing.

In an advantageous development of the invention, participant data can be stored in a database of a Directory Service, in particular an LDAP service (LDAP: Lightweight Directory Access Protocol). An interrogation of the participant data of the second participant by the Directory Service can be carried out in the context of the conversion of the communication system address into the PIM address. This is advantageous to the extent that in the case of companies, data about employees of the company and possibly likewise data about external partners of the company can already be stored in a central LDAP database for other purposes and therefore this already existing data can likewise be used in the context of the invention. It is furthermore advantageous that this data therefore just needs to be stored once and a configuration of this data in the PIM system and/or in the communication system is not required.

Data of this type about the employees or external partners comprises in particular the last name, first name, a directory number, an alternative mobile communication directory number, an employee number, an e-mail address, and/or a postal office address. In particular the directory number, as the communication system address, and the e-mail address, as the PIM address, can be retrieved from the database in the context of the invention and processed further.

BRIEF DESCRIPTION OF THE DRAWINGS

In the following, an exemplary embodiment of the invention is explained in detail on the basis of the drawing.

In this respect, the diagrams show, in schematic representation.

DETAILED DESCRIPTION OF INVENTION

Figure 1:
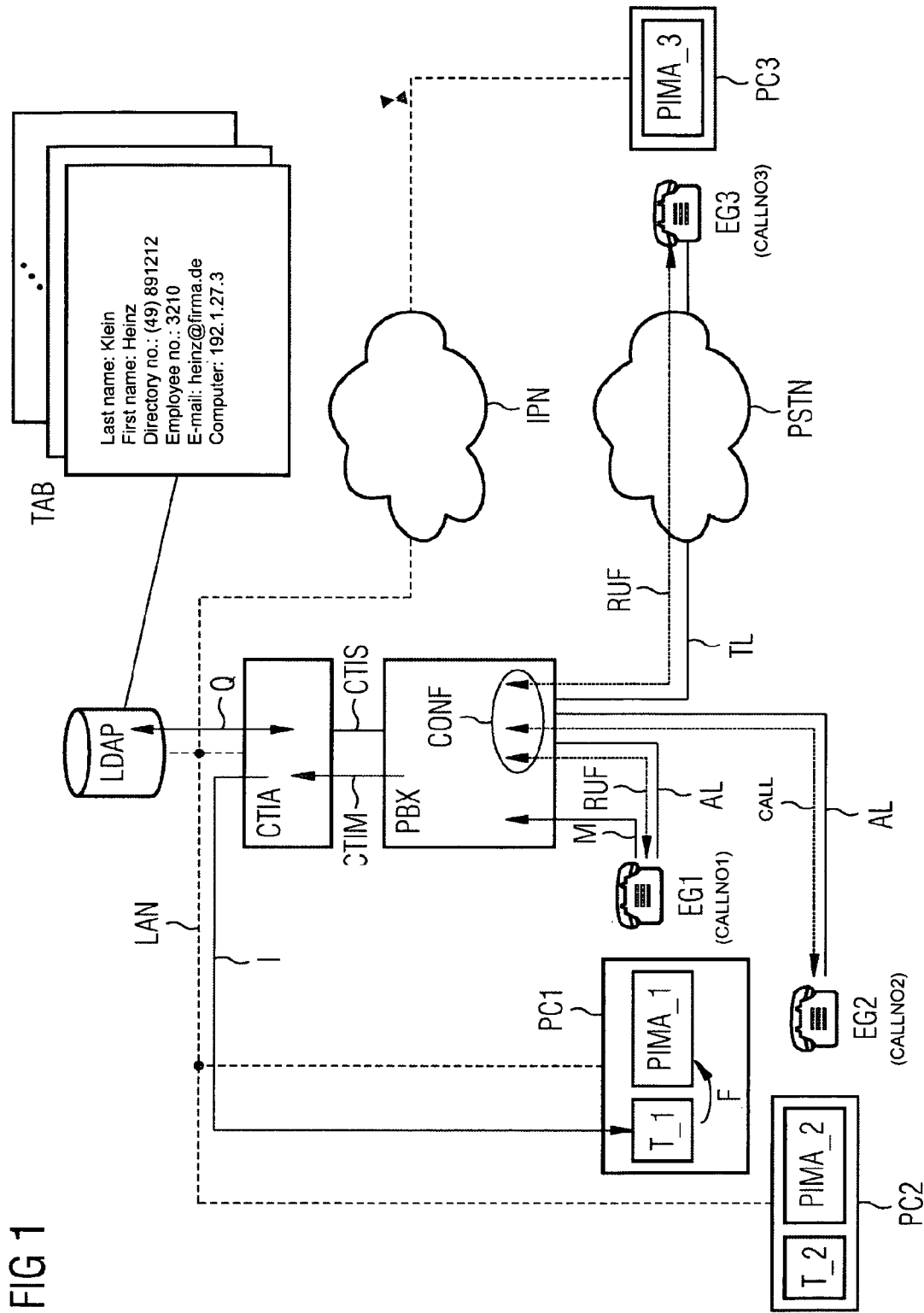
FIG. 1 A voice and a data communication system for implementing the inventive method, and FIG. 2 A partly filled-out meeting inquiry form of a PIM application.

FIG. 1 shows, in a schematic representation, a voice communication system as the inventive communication system with a switching system PBX represented as a rectangle. A further part of the voice communication system comprises a first telephone EG1 as the first end device and a second telephone EG2 as the second end device, respectively connected to the switching system PBX by way of a subscriber line AL, and also a third telephone EG3 as a further end device, connected by way of an exchange line TL by way of a public telephone network PSTN shown in stylized form as a cloud.

In this respect, a first directory number RUFNO1 is allocated to the first telephone EG1, a second directory number RUFNO2 to the second telephone EG2, and an allocated third directory number RUFNO3 to the third telephone EG3.

In this respect, the subscriber lines AL for connecting end devices (EG1, EG2) within a corporate network and the exchange line TL for connecting an end device (EG3) from outside the corporate network are represented as solid lines.

The data communication system encompasses a CTI application CTIA (CTI: Computer Telephony Integration) connected to the switching system PBX; a first, second, and third workstation computer PC1, PC2, PC3—respectively represented as a rectangle; and a Directory Service LDAP depicted as a cylinder. The CTI application CTIA, the first and second workstation computers PC1, PC2, and the Directory Service LDAP are interconnected by way of a local area network LAN depicted by means of a dashed line. The third workstation computer PC3 is connected to the local area network LAN by way of an external IP network IPN—in particular the global data network frequently referred to as the Internet—shown in stylized form as a cloud, this connection being represented by means of a dashed line.

The connection between the CTI application CTIA and the switching system PBX is effected by way of a CTI interface CTIS represented as a solid line between these two components.

Messages and data links between and within the components referred to in the foregoing are represented by means of solid arrowed lines with an arrow at one end or an arrow at both ends. These comprise in particular a key-press message M between an end device and the switching system PBX, a CTI message CTIM between the switching system PBX and the CTI application CTIA, an interrogation message Q of the CTI application CTIA to the Directory Service LDAP, an activation message I of the CTI application CTIA to a workstation computer, and a message F for filling out an electronic form between components of a workstation computer.

A circuit-based or packet-based communication link RUF for voice between the end devices EG1, EG2, EG3 and the switching system PBX is represented by means of a dotted line with an arrow at both ends. A conference circuit CONF of the voice communication links RUF is represented in stylized form by using an ellipse around the switching system-side ends of these dotted lines within the switching system PBX.

A participant table TAB of a database of the Directory Service LDAP is depicted by means of diagonally offset, overlapping rectangles, one rectangle representing a respective data record of the participant table TAB. By way of example, a data record containing the following data is specified within one of the rectangles:
Last name: Klein
First name: Heinz
Directory no.: (49)891212
Employee no.: 3210
E-mail: heinz@firma.de
Computer: 192.1.27.3

A first PIM application PIMA_1 running on the first workstation computer PC1, a second PIM application PIMA_2 running on the second workstation computer PC2, a third PIM application PIMA_3 running on the third workstation computer PC3, a first proxy application T_1 running on the first workstation computer PC1, and a second proxy application T_2 running on the second workstation computer PC2 are depicted as rectangles within their respective workstation computers PC1, PC2, PC3. In this respect, the data exchange between the PIM applications PIMA_1, PIMA_2, PIMA_3, and a PIM server—not represented—is effected by way of the local area network LAN.

In this respect, the PIM server comprises in particular a central server for managing and storing appointments, e-mails, and contacts—for example Microsoft Exchange. The PIM applications PIMA_1, PIMA_2, PIMA_3 comprise clients of this server for user input from a participant of the PIM server, for example in order to schedule an appointment. This comprises for example Microsoft Outlook.

The proxy applications T_1, T_2 comprise for example applications running permanently on the respective workstation computer PC1, PC2 that can respond to messages from the CTI application CTIA by way of a socket of the computer for example, and can transfer information from the said application to the respective PIM application PIMA_1, PIMA_2, and can initiate an opening of a form of the PIM application PIMA_1, PIMA_2. The use of proxy applications is of particular advantage if already existing products, such as Microsoft Outlook, are employed as PIM applications, which products have no interface to the CTI application CTIA.

The switching system PBX and the telephones EG1, EG2, EG3 would be provided for real-time communication while the PIM system and the PIM application PIMA_1, PIMA_2, PIMA_3 are normally, and in the present exemplary embodiment, provided for non-real-time communication.

Let it be assumed that a workplace of a first participant encompasses the first telephone EG1 and the first workstation computer PC1, and a data record for the first participant has been configured in the participant table TAB of the Directory Service LDAP. It is correspondingly assumed that a workplace of a second participant encompasses the second telephone EG2 and the second workstation computer PC2, and a data record for the second participant has been configured in the participant table TAB, and also that a workplace of a third participant encompasses the third telephone EG3 and the third workstation computer PC3, and a data record for the third participant has been configured in the participant table TAB. It is furthermore assumed that the second participant comprises the person named "Heinz Klein" and the configured data record in the participant table TAB is the person named in the foregoing.

The starting situation in FIG. 1 is the established telephone conference circuit CONF as a voice communication link between the three participants by way of their respective telephones EG1, EG2, EG3. While the conference circuit CONF is being implemented or following on from this, the wish arises among the participants that the three participants exchange views again at a later time by using a conference circuit. In order to schedule a future conference circuit or a future meeting, the first participant presses an identified key on his first telephone EG1 as an input means. As a result of this user input of the first participant, the key-press message M is transferred from the first telephone EG1 to the switching system PBX. Then a service feature is activated in the switching system PBX, in the context of which the CTI message CTIM is transferred from the switching system PBX to the CTI application CTIA by way of the CTI interface CTIS. The CTI message CTIM preferably encompasses the directory numbers RUFNO1, RUFNO2, RUFNO3 of all the participants of the conference circuit CONF and possibly further switching system-specific and/or link-specific data. In this respect, the connection by way of the CTI interface CTIS would be effected in particular by using the CSTA protocol (CSTA: Computer Supported Telecommunications Application) standardized by the ECMA (European Computer Manufacturers Association), by way of which the CTI application CTIA is informed about states and changes of state of the switching system PBX.

In this respect, the CTI application CTIA can run on a dedicated computer, in the switching system PBX or on one of the workstation computers PC1, PC2, PC3 represented.

As a data capture unit, the CTI application CTIA captures the directory numbers RUFNO1, RUFNO2, RUFNO3 transferred in the CTI message CTIM, captures the allocation of the directory numbers RUFNO1, RUFNO2, RUFNO3 to the telephones EG1, EG2, EG3, and captures which of the telephones—EG1 in the present exemplary embodiment—the key press has been carried out on. In this case, the directory number RUFNO2 of the second telephone EG2 (for example 1212) in particular is captured as the communication system address, this directory number RUFNO2 being allocated to the second telephone EG2 and therefore identifying the second telephone EG2.

In a subsequent method step, the captured directory numbers RUFNO1, RUFNO2, RUFNO3 are converted into a uniform format by the CTI application CTIA, e.g. into a so-called fully qualified directory number, into a so-called canonical address format or into a format with national code, local network code, equipment number, and/or extension number. For the directory number RUFNO2 of the second telephone EG2, this comprises for example (49)891212.

By interrogating this—possibly converted—directory number RUFNO2 by using the interrogation message Q from the CTI application CTIA to the Directory Service LDAP, associated data is retrieved by way of the participant table TAB with respect to the captured directory number RUFNO2 and delivered back to the CTI application CTIA. For the data record specified in the foregoing, this comprises the e-mail address "heinz@firma.de" as the PIM address of the PIM system. Furthermore, a computer IP address can also be delivered back—"192.1.27.3" for the specified example data record—which comprises the IP address of the workstation computer PC2.

In a similar manner, the corresponding data is also ascertained for the directory numbers RUFNO1, RUFNO3 of the first and third telephones EG1, EG3 and in particular converted into the associated e-mail addresses which identify the respective participants.

Together with the Directory Service LDAP, the CTI application CTIA therefore represents a conversion unit for converting a captured communication system address into a PIM address for the PIM system, which address identifies the respective participant of the end device.

In this respect, the Directory Service LDAP is preferably based on a database with a listing structure, access being effected by way of the LDAP protocol. The database preferably forms part of a so-called User Management System that manages all the employees of a company—e.g. the first and second participants—and also external contact persons—e.g. the third participant—centrally in the corporate network and provides standardized access to the data by way of the LDAP protocol.

Once the CTI application CTIA has captured the directory numbers RUFNO2, RUFNO3; the PIM addresses PIMA_2, PIMA_3; the last names of the participants; and the computer IP addresses of the conference participants, the CTI application CTIA sends the activation message I to the proxy application T_1 of the workstation computer PC1 of the first participant who implemented the user input by way of the first telephone EG1. In this respect, the proxy application T_1 comprises a permanently running process or one that is started up or reactivated by the CTI application CTIA.

The addressing of the proxy application T_1 is effected for example by way of the ascertained computer IP address for the first participant and a predefined port number. In the context of the activation message I, for example by way of a so-called "Remote Procedure Call" RPC, the ascertained data, in particular the e-mail addresses of the participants of the conference circuit, is transferred to the proxy application T_1.

The proxy application T_1 running on the workstation computer PC1 receives the activation message I and transfers the data contained in the activation message I to the first PIM application PIMA_1 on the same workstation computer PC1, that is to say in particular the e-mail addresses of the participants also. This transfer can be effected for example by means of a program call of the first PIM application PIMA_1, by means of interprocess communication or by means of an exchange of messages. In FIG. 1, this is depicted by means of the message F from the proxy application T_1 to the first PIM application PIMA_1.

Together with the proxy application T_1, the CTI application CTIA therefore represents a transfer unit for transferring the PIM address to a PIM application.

In a further method step, the PIM application PIMA_1 is started up if it is not yet active (this and further steps are not represented in FIG. 1). An electronic meeting inquiry form is opened and displayed on a screen—not represented—of the first computer PC1. The e-mail addresses of the participants are transferred to the PIM application PIMA_1 and in particular entered in the fields of the potential participants of the meeting. In the present exemplary embodiment therefore, the e-mail address "heinz@firma.de" in particular is entered in the meeting inquiry form.

If the e-mail addresses of all the conference circuit participants are entered in the meeting inquiry form, it is then particularly easy for the first participant to schedule a follow-up meeting with just a few remaining manual steps, by expanding the previously filled-out meeting inquiry form in particular with an appointment and textual information—e.g. a subject or an agenda—and subsequently terminating the editing of the meeting inquiry form. The PIM system then distributes a meeting inquiry, based on the e-mail addresses specified in the meeting inquiry form, to the PIM applications PIMA_2, PIMA_3 of the second and third participants and optionally to the PIM application PIMA_1 of the first participant filling out the meeting inquiry form.

The PIM application PIMA_1 and/or the proxy application T_1 therefore represent a form-filling unit for entering a transferred PIM address into a field of the electronic form of the PIM application.

With the method steps detailed in the foregoing, therefore, the scheduling of a meeting is simplified and less prone to error, since fewer manual steps than usual are carried out. Furthermore, a time saving is also produced in the case of the scheduling of meetings.

Figure 2:

FIG. 2 shows, in a schematic representation, a meeting inquiry form of the PIM application PIMA_1 filled out with the e-mail addresses of the three participants, as displayed to the first participant on the screen of the first workstation computer PC1 after running through the method steps referred to in the foregoing. In FIG. 2, the e-mail addresses of the three participants are entered in a table designated as "Participants". These would be a first e-mail address EMAIL1 "tln1@firma.de" for the first participant, a second e-mail address EMAIL2 "heinz@firma.de" for the second participant, and a third e-mail address EMAIL3 "tln3@extern.com" for the third participant. Moreover, the meeting inquiry form represented in FIG. 2 has further input fields such as "Betreff" ["Subject"], "Ort" ["Location"], "Beginnt um" ["Starting at"], "Endet um" ["Ending at"], and "Anschreiben" ["Message"] in order to be able to enter further information for the future meeting. Furthermore, the meeting inquiry form possesses a "Abschicken" ["Send"] control button in order to terminate the editing of the form and send it to the specified e-mail addresses (EMAIL1, EMAIL2, EMAIL3) as a meeting inquiry.

In the case of the use of templates and/or rules for further fields of the meeting inquiry form, it is possible to achieve the situation that, as a further method step, the meeting inquiry form immediately fills out all the further fields automatically on the basis of the template, terminates the editing of the meeting inquiry form automatically, and sends the meeting inquiry.

This is enabled in particular by means of the use of an automatic selection function of the PIM system for the meeting appointment. This can be used, e.g. in order to find the next possible meeting appointment. For example, the appointment closest in time that is labeled as available for the first and the second participant in common can be entered as the meeting appointment by means of the PIM system and/or by activation by the proxy application T_1, it being possible to observe predefinable limit conditions such as an exclusion of specific time bands—for example during the night or at the weekend. In this respect, time bands labeled as available in common would be those for which no appointments at all are stored in the PIM system for any of the participants.

In an alternative embodiment of the invention, an electronic form can be opened for the purposes of compiling a manual record of the meeting, the names of the participants and/or the period of the meeting already implemented being entered automatically in the text. To this end, the CTI application CTIA ascertains the names of the participants by way of the Directory Service LDAP and the duration of the conference by way of the CTI interface CTIS of the switching system PBX, and enters this information in fields of the meeting form. Furthermore, an audio recording of the conference can also be generated by way of the CTI application CTIA, which can likewise be transferred to the record-keeping participant together with the aforementioned information.

The telephones EG1 and EG2 in the present exemplary embodiment comprise terminals of the switching system PBX, while the third telephone EG3 comprises an external telephone, e.g. a mobile communication telephone. In this respect, the advantageous inclusion of telephones outside the switching system PBX is based on the fact that the participant table TAB is also configured for the external directory numbers of the external telephones (telephone EG3 with directory number RUFNO3 in the exemplary embodiment) and every external directory number is allocated an e-mail address (EMAIL3 in this instance).

Furthermore, a one-to-one allocation of a directory number of an end device of a participant to one participant and to one e-mail address preferably exists, in order thereby to facilitate an interrogation of the participant table TAB. In the case of ambiguities, the table structure of the participant table TAB should preferably implement a differentiation into main and secondary directory number and also main and secondary e-mail address and carry out the conversion of the main and secondary directory number to the main e-mail address.

As an alternative to the foregoing method steps, the user input can also be activated by means of an application on the workstation computer PC1 associated with the first telephone EG1. Furthermore, a direct data link can also exist between the first telephone EG1 and the first workstation computer PC1 or the association of a workstation computer to a telephone can be effected on the basis of a configuration or a registration.

In an inventive expansion of the present exemplary embodiment, a sending of the meeting inquiry form filled out with a time period can instigate a conference server of the communication system to reserve a communication system address of the first participant and the communication system address of the second participant for a conference circuit in the specified period and/or to call the first participant and the second participant at the beginning of the period. To this end, the CTI application CTIA can transfer not only the PIM addresses but also the communication system addresses of the participants to the respective PIM application (PIMA_1, PIMA_2) by way of one of the proxy applications T_1, T_2. Furthermore, the PIM system or the conference server can transfer a confirmatory e-mail to the participants of the future conference circuit, for example with a specification of access data to the conference of the conference server.

While the invention has been explained on the basis of a voice link or voice conference in the exemplary embodiment, the communication link can also comprise a video link, a video conference or a similar link between two or more communication partners.

Furthermore, as an alternative to the embodiment represented, the invention can also be realized in a corresponding manner for a gateway and/or a gatekeeper of a packet-based communication network with a circuit-switched switching system PBX.

The invention claimed is:

1. A method for populating an electronic conference form comprising:
    establishing a conference between a plurality of conference participants, the plurality of conference participants being associated with a plurality of end devices and being associated with a plurality of workstations;
    an activating participant of the plurality of conference participants activating a Computer Telephony Integration ("CTI") application, the CTI application being stored on a server that is connected to the plurality of end devices and the plurality of workstations;
    the CTI application capturing a plurality of directory numbers of the plurality of associated end devices during the established conference;
    the CTI application converting the plurality of captured directory numbers so that each of the converted directory numbers is in the same format;
    the CTI application retrieving communication information for each of the plurality of conference participants by interrogating a database using the converted directory numbers, the communication information comprising at least one of an email address of each of the plurality of conference participants and a name of each of the plurality of conference participants;
    the CTI application transferring the communication information of the plurality of conference participants to a first Personal Information Management ("PIM") application stored on a first workstation of the activating conference participant;
    the CTI application generating a recording of the established conference;
    the first PIM application automatically populating an electronic conference form with at least one of the email addresses of each of the plurality of conference participants and the names of each of the plurality of conference participants via the retrieved communication information;
    terminating the established conference; and
    sending the electronic conference form and the generated recording to a plurality of PIM applications stored on the plurality of workstations of the plurality of conference participants.

2. The method of claim 1 further comprising the first PIM application displaying the electronic conference form to the activating conference participant.

3. The method of claim 1 wherein the electronic conference form comprises an appointment inquiry form or a meeting inquiry form.

4. The method of claim 1 wherein the established conference comprises a voice conference or a video conference.

5. The method of claim 1 further comprising the first PIM application determining a first available date for a future conference between the plurality of conference participants and the first PIM application automatically populating the electronic conference form with the determined first available date for the future conference.

6. The method of claim 1 wherein at least one of the plurality of directory numbers of the plurality of associated end devices comprises an internal directory number and wherein at least one of the plurality of directory numbers of the plurality of associated end devices comprises an external directory number.

7. The method of claim 6 wherein the internal directory number comprises a telephone number of a telephone connected to a Private Branch Exchange ("PBX") and the external directory number comprises a number of a mobile communication telephone.

8. The method of claim 1 wherein the plurality of end devices comprise a plurality of telephones.

9. The method of claim 1 wherein the server comprises a computer device or a switch device connected to a PBX device.

10. The method of claim 1 further comprising the first PIM application automatically populating a plurality of further input fields of the electronic conference form based on a template and wherein the plurality of further input fields comprise at least one of a subject field, a location field, a starting time field, an ending time field, and a message field.

11. The method of claim 1 wherein the electronic conference form comprises a future conference request and the method further comprising reserving a time period on a conference server for the future conference request.

12. The method of claim 1 wherein the CTI application retrieving communication information for each of the plurality of conference participants by interrogating the database using the plurality of converted directory numbers comprises interrogating the database using a Computer Supported Telecommunications Application ("CSTA") protocol.

13. A system for populating an electronic conference form comprising:
- a plurality of end devices having a plurality of directory numbers and being associated with a plurality of conference participants;
- a server, the plurality of end devices being connected to the server;
- a plurality of workstations associated with the plurality of conference participants, the plurality of workstations connected to the server; and
- wherein the server captures the plurality of directory numbers of the plurality of associated end devices during an established conference between the plurality of conference participants upon activation by an activating participant of the plurality of conference participants; and
- wherein the server converts each of the plurality of captured directory numbers so that each of the converted directory numbers is in the same format; and
- wherein the server retrieves communication information for each of the plurality of conference participants by interrogating a database using the plurality of converted directory numbers; and
- wherein the communication information comprises at least one of an email address of each of the plurality of conference participants and a name of each of the plurality of conference participants; and
- wherein the server transfers the communication information of each of the plurality of conference participants to a first workstation of the activating conference participant; and
- wherein the server generates a recording of the established conference; and
- wherein the first workstation automatically populates an electronic conference form with at least one of the email addresses of each of the plurality of conference participants and the names of each of the plurality of conference participants via the retrieved communication information; and
- wherein the first workstation sends the electronic conference form and the generated recording to the plurality of workstations of the plurality of conference participants after termination of the established conference.

14. The system of claim 13 wherein the first workstation displays the electronic conference form to the activating conference participant.

15. The system of claim 13 wherein the established conference comprises a voice conference, a teleconference, or a video conference.

16. The system of claim 13 wherein the first workstation determines a first available date for a future conference between the plurality of conference participants and wherein the first workstation automatically populates the electronic conference form with the determined first available date for a future conference.

17. The system of claim 13 wherein at least one of the plurality of directory numbers of the plurality of associated end devices comprises an internal directory number and wherein at least one of the plurality of directory numbers of the plurality of associated end devices comprises an external directory number.

18. The system of claim 17 wherein the internal directory number comprises a telephone number of a telephone connected to a Private Branch Exchange ("PBX") and the external directory number comprises a number of a mobile communication telephone.

19. The system of claim 13 wherein the first workstation automatically populates a plurality of further input fields in the electronic conference form based on a template and wherein the plurality of further input fields comprise at least one of a subject field, a location field, a starting time field, an ending time field, and a message field.

20. The system of claim 13 wherein the electronic conference form comprises a future conference request and the first workstation reserves a time period on a conference server for the future conference request.

* * * * *